Figure 1:
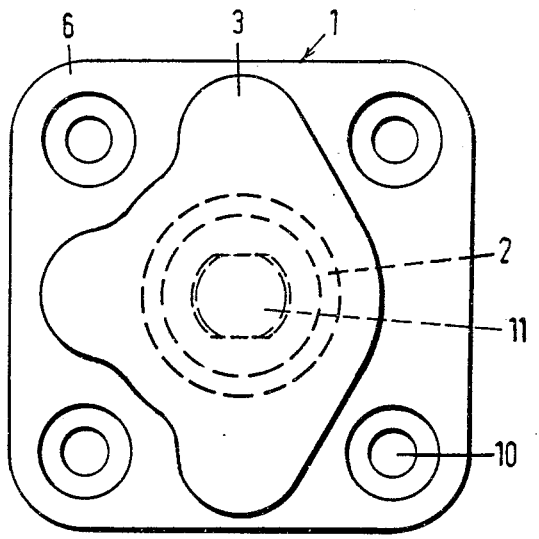

United States Patent [19]

Mampaeij

[11] 4,437,427
[45] Mar. 20, 1984

[54] BREAK BOLLARD

[76] Inventor: Johannes J. Mampaeij, 98 Abeelstraat, 3329 AG Dordrecht, Netherlands

[21] Appl. No.: 349,522

[22] Filed: Feb. 17, 1982

[30] Foreign Application Priority Data

Feb. 20, 1981 [NL] Netherlands .......................... 8100866

[51] Int. Cl.³ .......................... B63B 21/06; E02B 3/22
[52] U.S. Cl. .................................. 114/218; 24/115 F; 403/2; 411/5
[58] Field of Search ............... 114/364, 218; 24/115 F, 24/115 H; 403/2; 411/2, 3, 5, 81, 411, 424

[56] References Cited

U.S. PATENT DOCUMENTS

| | | | |
|---|---|---|---|
| 415,965 | 11/1889 | Fletcher | 114/218 |
| 2,677,863 | 5/1954 | St. John | 114/218 |
| 3,073,276 | 1/1963 | Taylor | 114/218 |
| 3,349,531 | 10/1967 | Watson | 403/2 |
| 4,258,607 | 3/1981 | McKewan | 411/2 |

FOREIGN PATENT DOCUMENTS 2307271 8/1974 Fed. Rep. of Germany .......... 411/3

*Primary Examiner*—Trygve M. Blix
*Assistant Examiner*—Rodney Corl
*Attorney, Agent, or Firm*—Anthony A. O'Brien

[57] ABSTRACT

A break bollard provided with a central post which is attached to a base plate which in its turn is secured to a stationary support construction by means of a screwed bolt construction with weakened region of incipient fracture, which is positioned between the screwed bolt head portion and a portion lying therebehind and arranged for engagement in rotary sense in case of fracture, thus ensuring, after fracture, an easy and rapid restoration to the original state.

3 Claims, 2 Drawing Figures

BREAK BOLLARD

The invention relates to a bollard provided with a central post with enlarged cap and with a base plate on which said post is attached and which baseplate in its turn is secured for anchoring purposes on a stationary support construction, while for the purpose of attachment use is made of a screwed bolt fastening with a weakened region of incipient fracture located between the portion which is engaged from the outside in rotary sense for tightening the screw connection and, viewed from the outside, a rear portion of the screw connection which is subjected to tensile load in axial direction during said tightening.

It is conventional for such bollards—called "break bollards", and whose aim it is, in case a given force exerted thereon by the vessel is exceeded, that the bollard attachment can collapse in order to thus prevent calamities—to provide anchoring bolts through which the base plate is secured to the stationary support construction, with a weakened region of incipient fracture. Said region should then lie underneath the nut through which the base plate is pressed down on said support construction by tightening said nut. In case of collapse of the weakened region of incipient fracture of the anchoring bolts, elaborate operations are necessary in this known embodiment for again anchoring the bollard in its original state. The anchoring bolts have to be replaced so that substantial breaking operations in the stationary support construction are required.

It is the object of the invention to provide an improvement so that after collapse of the weakened region of incipient fracture the original, anchored state can be restored in a very simple and inexpensive manner.

To this effect such a bollard according to the invention is further characterized in that the weakened region of incipient fracture is disposed in the said portion engaged for the purpose of tightening in rotary sense itself and said portion behind the weakened region of incipient fracture is arranged for engagement thereof from the outside in rotary sense in case of collapsed weakened region of incipient fracture for loosening the screw connection. It will be clear that when a thus designed break bollard is broken by collapse of the weakened region of incipient fracture, it is sufficient for restoring the original solidly anchored state, to replace each portion engaged for the tightening in rotary sense involved during the attachment and collapsed, by a new portion. Naturally, it is necessary to first loosen and remove the rests of the collapsed portion of the screw connection by engagement in rotary sense of the portion located behind the weakened region of incipient fracture.

While the weakened region of incipient fracture may concern the screw connection between the base plate and the stationary support construction, it is also possible and even particularly advantageous to apply the principle of the invention for a screw connection to be applied between post and base plate.

A preferred embodiment according to the invention is characterized in that the screw connection with the weakened region of incipient fracture is formed by a single central screwed bolt through which a sole plate is screwed down at the bottom of the hollow post on the base plate in a nut thread bore fixed relative to said base plate. This embodiment is also safe to the extent that in case the bolt head, by collapse of the weakened region of incipient fracture disappears therebehind, this remains within the hollow post and consequently can not cause injuries.

In a further elaboration of this preferred embodiment according to the invention, the weakened region of incipient fracture and the portion of the screw bolt located therebehind and adapted for loosening engagement thereof may be received with radial play in the central screwed bolt passage in the sole plate, while means are provided for said sole plate for centering same relative to the base plate.

The above centering means according to the invention preferably consist in a ring fitting about the sole plate and welded onto the base plate.

Such a central screwed bolt should be made of particularly strong steel, e.g. C45. Via the central cavity underneath the bollard whereon a removable cover is installed, the head of the central screwed bolt can be tightened when anchoring the post on the base plate. In case the central bolt in the weakened region of incipient fracture is collapsed behind, i.e. underneath the head, it is possible to loosen and remove the screwed bolt by engagement of the screwed bolt portion present behind said weakened region of incipient fracture adapted for loosening engagement of said screwed bolt. Subsequently the removed screwed bolt is replaced by a new one in order to anchor the post together with the sole plate mounted underneath again on the base plate. Said centering means ensure that the sole plate occupies the correct, properly centered position on the base plate. In other words it is thus ensured that the radial play around the weakened region of incipient fracture and around the engagement means located therebehind, respectively thereunder for the renewed loosening in uniformly present all around. As a result for the purpose of said loosening in the contemplated manner, a particular tool can engage unimpededly the specially arranged portion behind the collapsed region of incipient fracture.

Figure 2:
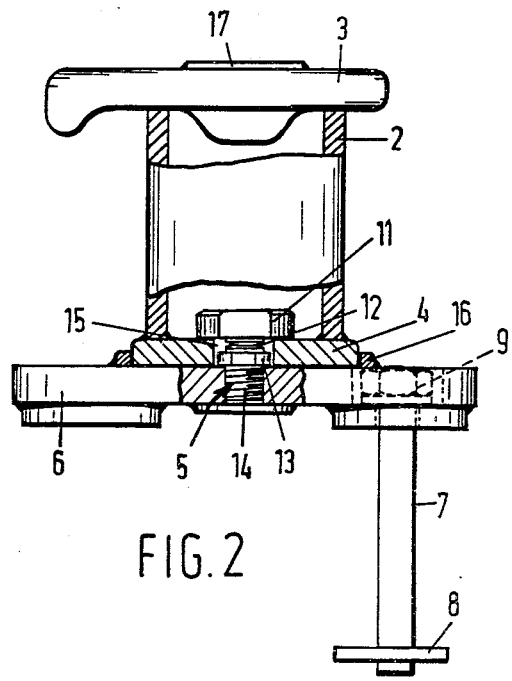

One embodiment of the break bollard according to the invention will now be explained, by way of example, with reference to the accompanying drawing, wherein FIG. 1 is a diagrammatic top plan view of the break bollard;

FIG. 2 is a side elevation view of FIG. 1 with broken away portions indicating only one of the four anchoring bolts for the base plate on the stationary support construction and with omission of said support construction.

In accordance with the drawing reference numeral 1 generally indicates a break bollard. It consists of a hollow post 2, the central cavity of which is closed at the top by means of a stationary cap 3 with a removable cover 17 and at the bottom by a sole plate 4 welded onto the post 2. The post assembly 2, 3, 4 is screwed onto the base plate 6 by means of a central screwed bolt of steel grade C45. Said base plate 6 in its turn is anchored through four anchoring bolts 7 to a stationary support construction, not shown, e.g. of concrete. The anchoring bolts 7 comprise at the bottom a cross member 8 which, in case the stationary support construction consists of concrete, together with the major portion of the shank of the anchoring bolt 7 is embedded in concrete. By 9 in FIG. 2 is indicated a nut through which the anchoring of the base plate 6 is tightened on the stationary support construction. It is observed that in FIG. 1 the anchoring bolts are not shown, but only the passages for the four anchoring bolts 7, at which reference numeral 10 is placed.

The central anchoring or attachment screwed bolt 5 through which the sole plate 4 welded onto the bottom of the post 2 is solidly screwed onto the base plate 6, comprises a head with a front side visible in FIG. 1 and diametrically opposite flattened portions. By means of a suitable wrench the screwed bolt 5 can thus be tightened be engagement via the central cavity in the post 2, naturally after removal of the detachable cover 17 from the cap 3. The reference numeral 11 is positioned at the head. Slightly therebehind there is provided the weakened region of incipient fracture indicated by 12 and behind said region—indicated by numeral 13—a screwed bolt portion having a similar shape provided with two diametrically opposite flattened portions as head 11 but smaller in radial and also axial sense. The radial extension of the portion 13, however, is larger than the threaded lower bolt shank portion 14 of the screwed bolt.

The weakened region of incipient fracture 12 and the above portion 13 are provided with radial play within the central passage 15 for the screwed bolt 5 in the sole plate 4. A centering ring 16 welded onto the base plate 6 within which the sole plate 4 exactly fits, ensures the proper centering of the sole plate and hence likewise the above play all around, so that in case of collapsed weakened region of incipient fracture 12 engagement of the portion 13 can take place for loosening the rest of the screwed bolt 5, viz. the shank portion 14 with the portion 13. When the post with its sole plate 4 has again been positioned fittingly in the centering ring 16, a new central screwed bolt 5 can be turned in in order to restore the normal anchored state of the post on the base plate.

It will be clear that many variants are possible within the scope of the invention relative to the embodiment of the invention shown in the drawing and described in the above.

What I claim is:

1. An improved break bollard including a base plate having a central threaded bore and being adapted to be anchored to a stationary support, a central post having a removable enlarged cap on one end and a sole plate on an opposite end, and threaded bolt means for securing said central post and said sole plate to said base plate wherein the improvement comprises:

an aperture in said sole plate aligned with the central threaded bore in said base plate;

a threaded portion along one end of said bolt means engaged in said central threaded bore;

a first head portion on said bolt means terminating said threaded portion;

a second head portion at the other end of said bolt means, said second head portion being of larger diameter than said first head portion and adapted to engage the sole plate around the periphery of said aperture;

a weakened region of incipient fracture on said bolt means between said first and second head portions; and said threaded bolt means being tightened into said base plate for retaining the sole plate on said base plate; and said weakened region of incipient fracture being fractured in response to excessive force on the central post whereby the first head portion on said bolt means and its attached threaded portion in said base plate may be removed by rotation of said first head portion which is located beneath the weakened region of incipient fracture.

2. An improved break bollard as claimed in claim 1 wherein said aperture in said sole plate is enlarged relative to said threaded bolt means whereby there is radial play between said threaded bolt means and said sole plate.

3. An improved break bollard as claimed in claim 2 wherein a centering ring is fixed to said base plate and said sole plate is received in said centering ring to retain said central post in alignment on said base plate.

* * * * *